United States Patent
Ooghe et al.

(10) Patent No.: US 8,467,388 B2
(45) Date of Patent: Jun. 18, 2013

(54) REPORTING MULTICAST BANDWIDTH CONSUMPTION BETWEEN A MULTICAST REPLICATING NODE AND A TRAFFIC SCHEDULING NODE

(75) Inventors: Sven Maurice Joseph Ooghe, Ghent (BE); Wim Henderickx, Westerlo (BE); Ron Efraim Haberman, Mountain View, CA (US)

(73) Assignee: Alcatel Lucent, Paris (FR)

( * ) Notice: Subject to any disclaimer, the term of this patent is extended or adjusted under 35 U.S.C. 154(b) by 410 days.

(21) Appl. No.: 11/771,820

(22) Filed: Jun. 29, 2007

(65) Prior Publication Data

US 2008/0123648 A1 May 29, 2008

(30) Foreign Application Priority Data

Jul. 4, 2006 (EP) .................................... 06291113

(51) Int. Cl.
*H04L 12/28* (2006.01)
(52) U.S. Cl.
USPC ......................................................... 370/390
(58) Field of Classification Search
None
See application file for complete search history.

(56) References Cited

U.S. PATENT DOCUMENTS

| | | | | |
|---|---|---|---|---|
| 2001/0004350 A1* | 6/2001 | Lefebvre et al. | ............... | 370/231 |
| 2003/0005144 A1* | 1/2003 | Engel et al. | .................... | 709/235 |
| 2005/0129017 A1* | 6/2005 | Guingo et al. | ................ | 370/390 |
| 2005/0232293 A1* | 10/2005 | Pelt et al. | ....................... | 370/432 |
| 2005/0276263 A1* | 12/2005 | Suetsugu et al. | .............. | 370/389 |
| 2006/0206600 A1* | 9/2006 | Wong et al. | ................... | 709/223 |
| 2006/0209825 A1* | 9/2006 | Carroll et al. | ................. | 370/390 |
| 2006/0242457 A1* | 10/2006 | Roy et al. | ......................... | 714/12 |
| 2007/0107023 A1* | 5/2007 | Versteeg et al. | ................. | 725/95 |

OTHER PUBLICATIONS

Wadhwa, Sanjay et al., GSMP Extensions for Layer2 Control (L2C) Topology Discovery and Line Configuration, Jan. 20, 2006, IETF, All pages pertinent.*
NETCOM: "DSL Evolution: IP QoS Enabled Services" Jun. 4, 2006, pp. 1-8, XP002411173.
DSL Forum: "Migration to Ethernet-Based DSL Aggregation" Apr. 2006, pp. 1-101, XP002411174.
Doria Lulea University of Technology, et al.: "General Switch Management Protocol (GSMP) Applicability" IETF Standard, Internet Engineering Task Force, IETF, CH, Jun. 2002, pp. 1-9, XP015009072.
Salim Hariri, et al.: "QoS Resource Management using e-GSMP" Simulation Series, online 2002, pp. 1-15, XP002411175.

* cited by examiner

*Primary Examiner* — Otis L Thompson, Jr.
(74) *Attorney, Agent, or Firm* — Harness, Dickey & Pierce

(57) ABSTRACT

A multicast replicating network node (203) according to the present invention reports to a traffic scheduling network node (205) information (231) indicative for the bandwidth consumed by multicast services or indicative for the bandwidth available for unicast services on a line coupled to the multicast replicating network node (203). The traffic scheduling network node (205) this way stays aware of the multicast bandwidth occupancy on different subscriber lines and access node uplinks without serious impact on its processing requirements.

7 Claims, 1 Drawing Sheet

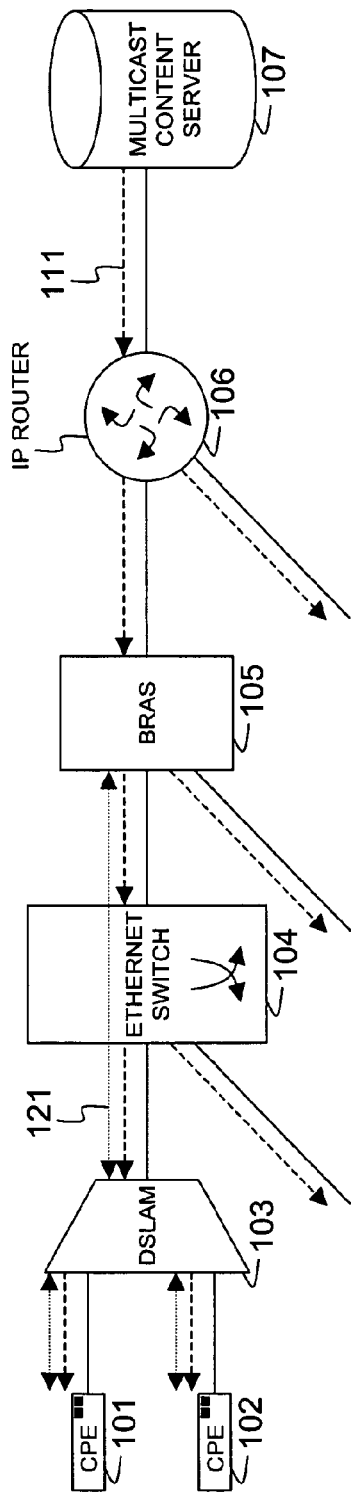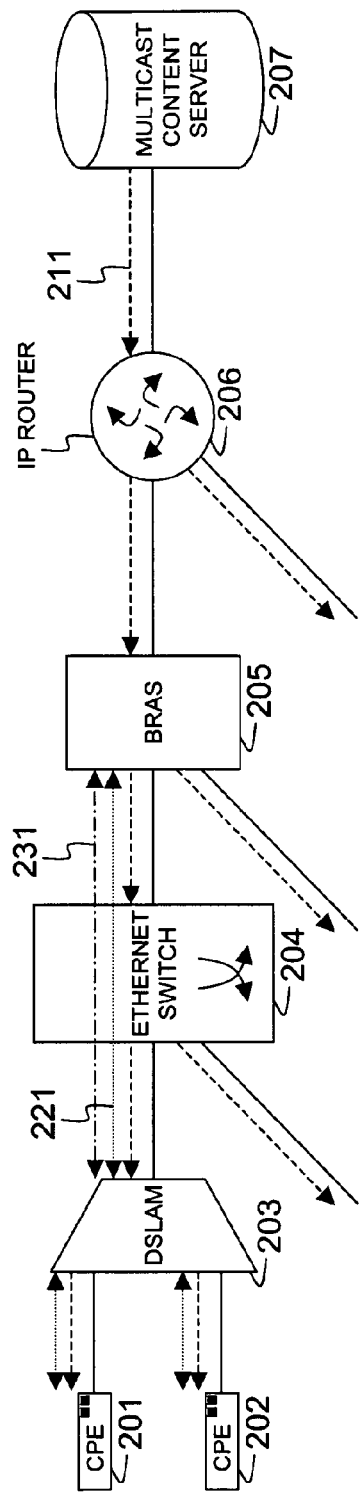
Fig. 1 (PRIOR ART)
Fig. 2

REPORTING MULTICAST BANDWIDTH CONSUMPTION BETWEEN A MULTICAST REPLICATING NODE AND A TRAFFIC SCHEDULING NODE

FIELD OF THE INVENTION

The present invention generally relates to communication networks wherein unicast services like high speed Internet access, and multicast services like broadcast TV, are concurrently deployed. These services in other words at least partially make use of the same infrastructure, e.g. the same Digital Subscriber Line (DSL) access network. The multicast services are replicated in multicast replicating nodes that are able to snoop, proxy or terminate the multicast control protocol that is used by subscribers to join or leave a multicast service. The Internet Group Management Protocol (IGMP) is an example of such a multicast control protocol. The multicast replicating nodes interpret the multicast control protocol messages and copy the multicast stream onto the communication lines towards subscribers that join the multicast service, or delete the multicast stream from communication lines towards subscribers that leave the multicast service. Further, one or more network nodes deeper in the network, for instance Layer 2 aggregation devices or Layer 3 edge devices or so called Broadband Network Gateways (BNGs), may be responsible for traffic scheduling in order to ensure fairness between multiple service classes, multiple services and multiple subscribers, and to improve utilization of network resources as well as quality of service (QoS) experience. The traffic scheduling network node(s) need to be aware of the amount of bandwidth that is used on the subscriber loops and access node uplinks for multicast services in order to enable optimal traffic scheduling. Without knowledge of the bandwidth that is consumed by multicast services, the traffic scheduling process will be sub-optimal, as a result of which too much traffic may be sent downstream eventually causing congestion and loss of data, or alternatively insufficient traffic may be sent downstream leaving part of the network resources underutilized.

BACKGROUND OF THE INVENTION

A known approach, ensuring that the traffic scheduling process stays in sync with the bandwidth usage by multicast services in the access network is based on IGMP correlation at the Broadband Network Gateway (BNG) or—more generally—at the traffic scheduling network node. IGMP correlation can be achieved by intercepting at the BNG upstream IGMP messages sent over a PPPoE (Point-to-Point Protocol over Ethernet) session to the BNG, or by using IGMP transparent snooping in the multicast replicating nodes. IGMP correlation at the BNG and IGMP transparent snooping are for instance described in section 6.3.2.3 and section 1.6 of DSL Forum Technical Report TR-101 entitled "Migration to Ethernet-Based DSL Aggregation", published in April 2006 by the DSL Forum Architecture and Transport Working Group. Therein, the multicast replication nodes, e.g. the access nodes and aggregation switches, transparently snoop the IGMP join/leave messages which further travel upstream to the Broadband Network Gateway (BNG) in order to be intercepted there as IPoE (Internet Protocol over Ethernet) packets.

A drawback of IGMP correlation at the BNG, is that this solution results in high IGMP traffic towards the BNG, and consequently in high processing requirements for the BNG that has to deal with the high IGMP load.

Another drawback of IGMP correlation at the BNG, in particular the variant based on transparent snooping in the multicast replicating nodes, is that the BNG needs to determine to which access loops the IGMP messages refer in order to be able to update the traffic scheduling process. This requires the BNG to perform a correlation process between the source MAC and/or IP addresses of the IGMP message and the access loop identifier that is sent to the BNG at the time of PPP (Point-to-Point Protocol) or IP (Internet Protocol) session establishment. This complicates the overall decision process in the BNG.

An alternative model enabling concurrent, QoS aware deployment of unicast and multicast services, described in section 2.9, paragraph 2, of DSL Forum Technical Report TR-101 is based on distributed precedence and scheduling. In this model, the different services are marked according to a precedence relationship. Under congestion, traffic belonging to lower precedence classes will be dropped first. Although this model provides fairness between classes of a same precedence, it cannot establish fairness amongst users within the same class.

A further remark in relation to the prior art solutions, i.e. either the solution based on IGMP correlation or the solution based on distributed precedence and scheduling, is that these techniques may be implemented in a multi-BNG scenario, where the bandwidth is partitioned amongst two or more Broadband Network Gateways which each control the traffic within their partition. Although the static partitioning introduces limitations to the dynamic share of resources between multicast and unicast services, the multi-BNG implementations in general suffer from disadvantages similar to their single-BNG equivalent: multi-BNG solutions based on IGMP correlation put high IGMP processing requirements on the BNGs and require a more complex correlation process to be in place; multi-BNG solutions based on distributed precedence and scheduling on the other hand fail to establish fairness amongst users of a same class of service. An additional complexity introduced by multi-BNG solutions based on IGMP correlation is that measures must be taken in the network to ensure that IGMP messages arrive at all BNGs.

It is an object of the present invention to provide a multicast replicating network node and traffic scheduling network node that overcome the disadvantages of the above described prior art solutions. In particular, it is an object to define a multicast replicating network node and a traffic scheduling network node which enable traffic scheduling taking into account the bandwidth amounts occupied by multicast services in the access network, but with reduced processing requirements on the traffic scheduling network node.

SUMMARY OF THE INVENTION

According to the present invention, the above objects are realized and the above mentioned shortcomings of the prior art solutions are overcome through a multicast replicating network node and a traffic scheduling network node. The multicast replicating network node comprises means for reporting to the traffic scheduling network node information indicative for the bandwidth consumed by multicast services or indicative for the bandwidth available for unicast services on lines coupled to the multicast replicating network node. The traffic scheduling network node on the other hand comprises means to receive and interpret that information in order to be used in the traffic scheduling process.

Thus, the present invention introduces a dedicated control mechanism, e.g. a Layer 2 control mechanism, enabling access nodes, aggregation switches and other nodes with multicast replication functionality to inform the access server, broadband network gateway or other node with traffic scheduling functionality on the changes in multicast bandwidth usage or unicast bandwidth availability on certain lines. These lines may be subscriber lines between an access node and respective user premises, or may be access node uplinks, aggregation switch uplinks, etc. The invention consists in announcing to the traffic scheduling network node whatever information that enables the latter one to determine the amount of bandwidth that is used by multicast services or that remains available for unicast services on the different communication lines in the access or aggregation network, i.e. subscriber lines, access node uplinks, aggregation switch uplinks, etc.

In addition, the current invention also relates to a control method used between a multicast replicating network node and a traffic scheduling network node operating in accordance with the present invention.

A first optional feature of the multicast replicating network node according to the present invention is that the control information generated thereby may represent the amount of bandwidth consumed by multicast services on a line coupled thereto.

This way, the processing requirements on the traffic scheduling node are minimized since the received information explicitly indicates the bandwidth amount consumed by multicast services. No further calculations are required in order to derive the multicast bandwidth usage from the control information shared.

Another, optional feature of the multicast replicating node according to the present invention is that the control information generated thereby may represent the amount of bandwidth available for unicast services on a line coupled thereto. Hence, as an alternative to the amount of bandwidth occupied by multicast services, the access node or more generally—the multicast replicating node may keep the traffic scheduling node aware of the amount of bandwidth which is not occupied by multicast services and consequently remains available for unicast services.

A further optional feature of the multicast replicating network node according to the present invention is that the control information generated thereby may represent a change in bandwidth consumed by multicast services on a line coupled to the multicast replicating network node.

Thus, when the multicast replicating node, e.g. the DSLAM, is aware of the current bandwidth usage and the new bandwidth usage when for instance an IGMP join or leave message is received, it may be sufficient to report this change in multicast bandwidth occupancy to the traffic scheduling network node. If for instance the multicast bandwidth occupancy will change from 5 Mbps to 9 Mbps as a result of a subscriber zapping from a broadcasted SDTV (Standard Definition Television) channel to a broadcasted HDTV (High Definition Television) channel, the access node intercepting the IGMP leave request for the SDTV channel and the IGMP join request for the HDTV channel may inform the BNG on the anticipated increase of multicast bandwidth occupancy by 4 Mbps.

Similarly, the current invention may optionally be implemented through reporting control information that represents the change in bandwidth available for unicast services on a line coupled to the multicast replicating network node.

In the example of the previous paragraphs, this would imply that an anticipated decrease of the available unicast bandwidth by 4 Mbps would be reported on the subscriber line towards a user zapping from an SDTV to an HDTV channel.

A further, optional characteristic of the multicast replicating network node according to the current invention is that the change in bandwidth may be reported only when different from zero.

This way, the processing load on the traffic scheduling network node is further reduced. By reporting only changes in the multicast bandwidth consumption or unicast bandwidth availability different from zero, the number of control messages sent to the traffic scheduling network node is reduced significantly. This is so because the multicast channels typically can be categorized in groups that consume an equal or similar amount of bandwidth: SDTV, HDTV, streaming audio, etc. If a user zaps between two SDTV channels, this will not result in a significant change of the bandwidth amount consumed by multicast services, and should therefore not be reported to the BNG.

Yet another optional feature of the multicast replicating network node according to the present invention is that the control information generated thereby is embedded in at least one General Switch Management Protocol (GSMP) extension.

Indeed, the invention can be implemented through a protocol that will be used for Layer 2 Control such as the General Switch Management Protocol (GSMP), provided this protocol is extended with one or several TLVs (reserved Type, Length and Value codepoints). As an alternative to GSMP, the current invention could be implemented through current or future variants of SNMP (Simple Network Management Protocol) or the Radius (Remote Authentication and Dial-In User Service) protocol, or though a proprietary protocol assuming that both the multicast replicating nodes and the traffic scheduling node(s) in the network are aware of that proprietary protocol.

The multicast replicating network node may be a Layer 2 access node, an access multiplexer such as a DSLAM (Digital Subscriber Lina Access Multiplexer), a DLC (Digital Loop Carrier), a CMTS (Cable Modem Termination System), a PON LT (Passive Optical Network Line Termination), an aggregation switch such as an Ethernet switch, an edge router, or any other network node in the multicast distribution chain with multicast replication functionality.

Similarly, the traffic scheduling network node according to the present invention can be an Ethernet switch, a Broadband Network Gateway (BNG), a Layer 3 edge device, a Broadband Remote Access Server (BRAS), or any other network node with traffic scheduling capabilities or more advanced QoS and policy management capabilities.

BRIEF DESCRIPTION OF THE DRAWINGS

FIG. 1 illustrates a network architecture incorporating multicast replicating network nodes and a traffic scheduling network node operating according to the prior art; and FIG. 2 illustrates a network architecture incorporating multicast replicating network nodes and a traffic scheduling network node operating according to the present invention.

DETAILED DESCRIPTION OF EMBODIMENT(S)

In the network architecture drawn in FIG. 1, DSL CPE modems 101 and 102 are coupled via subscriber lines to respective line terminations in DSLAM 103. DSLAM 103 is uplink connected to an Ethernet switch 104 that is further uplink coupled to BRAS 105. The network from the subscriber premises up to the BRAS 105 is named the access network. BRAS 105 is further coupled to a multicast content server 107 via one or more IP routers 106 that constitute a so called regional network.

The dashed arrows 111 in FIG. 1 show the multicast streaming. From the multicast content server 107 down to the subscriber modems, a multicast tree is set up that can be joined or left dynamically by subscribers. To join or leave the multicast tree, the subscribers send upstream IGMP messages. These IGMP messages are proxied or snooped by the DSLAM 103 as is illustrated by the dotted arrows. The DSLAM interprets the IGMP messages and eventually replicates multicast streams that are already available in the DSLAM 103 for downstream delivery to newly joining subscribers. Similarly, the DSLAM terminates downstream delivery of a multicast stream when an IGMP leave message is received from a subscriber. Also the Ethernet switch 121 has multicast replication capabilities and consequently also performs IGMP snooping or proxying. None of the IGMP messages are terminated however in the DSLAM 103 or the Ethernet switch 104. All IGMP messages in the prior art architecture of FIG. 1 are upstream forwarded up to the BRAS where the IGMP messages may be terminated by an IGMP server, and the contents of the IGMP messages may be interpreted in order to adapt the traffic scheduling process in the BRAS 105. In FIG. 1, all IGMP messages must be processed by the BRAS which consequently must meet high IGMP processing requirements.

In the architecture illustrated by FIG. 2, CPE modems 201 and 202 are again connected via subscriber loops to respective line terminations in the DSLAM 203. The DSLAM 203 is uplink coupled to an Ethernet switch 204 which further uplink connects to BRAS 205. The network from the customer premises hosting CPE modems 201 and 202 up to BRAS 205 is named the access network. The BRAS is further coupled to a multicast content server 207 via one or more IP routers 206 that constitute the so called regional network.

The dashed arrows 211 again indicate the multicast streaming from the multicast content server 207 to the subscriber modems 201 and 202. The architecture of FIG. 2, which operates according to the principles underlying the present invention differs from the architecture in FIG. 1 in the way the IGMP messages are handled.

If it is assumed for instance that the first user zaps from an SDTV channel to a HDTV channel that will occupy an additional 5 Mbps downstream bandwidth on the subscriber loop between DSLAM 203 and CPE modem 201, IGMP messages are sent from the CPE modem 201 to the DSLAM 203. The IGMP message stream is again indicated by the dotted arrows in FIG. 2. In the just given example, an IGMP leave message shall be issued for the SOW channel, immediately followed by an IGMP join message for the HDTV channel. In case where the newly requested HDTV channel is available in the DSLAM 203, the latter DSLAM 203 starts replicating the HDTV channel on the subscriber line towards CPE modem 201. In addition, the DSLAM 203 shall send a GSMP message towards the BRAS 205 indicating that an additional 5 Mbps bandwidth will be consumed by multicast services on the access loop towards the first user. The GSMP message may contain the new total bandwidth consumed by multicast services on the first access loop, or alternatively may mention the bandwidth amount left available for unicast services on the access loop towards the first user, or still alternatively may mention the surplus of 5 Mbps that will be occupied by multicast services as a result of the channel change. Upon receipt and interpretation of the GSMP message, the BRAS 205 adjust its traffic scheduling process, e.g. its hierarchical scheduling algorithm in order to take into account the new situation in the subscriber line towards the first user. The traffic scheduler shall for instance reduce the Internet access bandwidth for the first user in order to prevent congestion and loss of traffic on the first subscriber line. If the newly requested HDTV channel would not have been available at the DSLAM 203, the DSLAM 203 would first send an IGMP report requesting delivery of the HDTV channel to a network node with replication capabilities higher up in the network. After that, the DSLAM 203 shall send a GSMP message towards the BRAS 205 indicating that an additional 5 Mbps bandwidth will be consumed by multicast services on the access loop towards the first user. The BRAS 205 in the architecture of FIG. 2 hence only has to process a limited amount of IGMP messages for multicast streams that cannot be handled and replicated yet by the nodes closer to the subscribers.

Although the present invention has been illustrated by reference to specific embodiments, it will be apparent to those skilled in the art that the invention is not limited to the details of the foregoing illustrative embodiments, and that the present invention may be embodied with various changes and modifications without departing from the spirit and scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the spirit and scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned.

The invention claimed is:

1. A multicast replicating network device, comprising:
   an interface coupled to one or more network signal lines;
   a controller coupled to the interface and configured to:
   (a) terminate at least one of a plurality of multicast control protocol messages towards a traffic scheduling network device; and
   (b) report to the traffic scheduling network device information representing bandwidth consumed by multicast services on a line coupled to said controller or representing bandwidth available for unicast services on the line coupled to said controller,
   said information representing a change in bandwidth from a first service to a second service by a data rate consumed by the multicast services on the line coupled to said controller if changing from the first service to the second service,
   the termination of at least one of the multicast control protocol messages towards the traffic scheduling network device performed when the second service is available from the controller, and
   the controller configured to report the traffic scheduling network device information only when the change in bandwidth is greater than or less than zero and the second service is not available from the controller.

2. The multicast replicating network device according to claim 1, wherein said information represents a change in bandwidth available for unicast services on said line coupled to said controller.

3. The multicast replicating network device according to claim 1, wherein said controller is configured to embed said information in at least one General Switch Management Protocol extension.

4. The multicast replicating network device according to claim 1, wherein the interface an input of the controller and wherein said controller correspond to an instantiation of one or more of the following:
- a Layer 2 access node,
- an access multiplexer,
- an aggregation switch and
- an edge router.

5. A traffic scheduling network device, comprising:
- a controller to perform a scheduling function; and
- an interface coupled to the controller and configured to:
  - receive from a multicast replicating network device and interpret information representing bandwidth consumed by multicast services on a line coupled to said multicast replicating network device or representing bandwidth available for unicast services on the line coupled to said multicast replicating network device,
- said information representing a change in bandwidth from a first service to a second service by data rate consumed by the multicast services on the line coupled to said multicast replicating device if changing from the first service to the second service, and
- the controller configured to receive the traffic scheduling network device information only when the change in bandwidth is greater than or less than zero and the second service is not available from the multicast replicating network device.

6. The traffic scheduling network device according to claim 5, wherein the interface is an input of the controller and wherein said controller corresponds to an instantiation of one or more of the following:
- an aggregation switch,
- a Broadband Network Gateway,
- a Layer 3 edge device and
- a Broadband Remote Access Server.

7. A control method between a multicast replicating network device and a traffic scheduling network device, comprising:
- terminating at least one of a plurality of multicast control protocol messages from the multicast replicating network device to the traffic scheduling network device; and
- reporting from said multicast replicating network device to said traffic scheduling network device information representing bandwidth consumed by multicast services on a line coupled to said multicast replicating network device or representing bandwidth available for unicast services on the line coupled to said multicast replicating network device, and
- receiving and interpreting said information in said traffic scheduling network node, said information representing a change in bandwidth from a first service to a second service by data rate consumed by the multicast services on the line coupled to said multicast replicating device if changing from the first service to the second service,
- the terminating including terminating at least one of the multicast control protocol messages from the multicast replicating network device to the traffic scheduling network device when the second service is available, and
- the reporting occurring only if the change in bandwidth is greater than or less than zero and the second service is not available from the multicast replicating network device.

* * * * *